United States Patent [19]
Haendle et al.

[11] Patent Number: 5,473,659
[45] Date of Patent: Dec. 5, 1995

[54] RADIOLOGICAL SYSTEM SWITCHABLE FOR IMAGE PLAYBACK WITH A HIGH NUMBER OF IMAGE LINES

[75] Inventors: Joerg Haendle; Heinz Horbaschek, both of Erlangen, Germany

[73] Assignee: Siemens Aktiengesellschaft, Munich, Germany

[21] Appl. No.: 268,627

[22] Filed: Jun. 30, 1994

[30] Foreign Application Priority Data

Jun. 30, 1993 [DE] Germany ............... 43 21 790.7

[51] Int. Cl.[6] .................................................. H05G 1/64
[52] U.S. Cl. .................... 378/98.2; 378/114; 378/116
[58] Field of Search .................... 378/98.2, 98.5, 378/98.12, 114, 115, 116

[56] References Cited

U.S. PATENT DOCUMENTS 5,022,063  6/1991  Yokouchi et al. .
5,054,045  10/1991  Whiting et al. .
5,128,754  7/1992  Dhein .

OTHER PUBLICATIONS

"Toko, Inc. data sheet for down converter MDC 1000 and Up–converter MUC1000" no date.

*Primary Examiner*—David P. Porta
*Attorney, Agent, or Firm*—Hill, Steadman & Simpson

[57] ABSTRACT

A radiological system includes an image pick-up chain which includes an image processor having at an N-output, at which images having a number of lines which is standard, and an H-output for an H-image having a higher number of lines than the standard image. A video recorder is connectable to the N-output, an H-image playback unit is connectable to the H-output. The video recorder is in the image transmission chain, and has an output connected through an up-scan standards converter to a switch, by means of which the H-image playback unit can be connected to an output of the up-scan standards converter.

11 Claims, 2 Drawing Sheets

RADIOLOGICAL SYSTEM SWITCHABLE FOR IMAGE PLAYBACK WITH A HIGH NUMBER OF IMAGE LINES

BACKGROUND OF THE INVENTION

1. Field of the Invention

The present invention is directed to a radiological system of the type capable of generating a "normal" image corresponding to a standards system, as well as an "H-image" which has a higher number of lines that the normal image.

2. Description of the Prior Art

Radiological systems are known which can be operated in different modes, using different image processing chains, to produce a so-called "normal image" according to a standards system (such as the NTSC system in the United States, or different systems in Europe), as well as a so-called "H-image" which has a higher number of image lines than the normal image, in order to provide higher definition of a region of the examination subject.

Radiological systems of this type are installed in certain clinics. Typically, the image processing chain will include an N-output for the normal images, to which a video recorder is connectable, and an H-output for the H-image, to which an H-image playback unit is connectable. A video recorder as disclosed, for example, in U.S. Pat. No. 5,054,045 can only record normal images with a normal number of lines (for example, 625 lines) with good image quality. If an attempt were made to employ such a known video recorder to record an image having a high number of lines, for example 1249 lines, recording would, at most, be possible with very poor image quality. For this reason, known systems of the type described above employ a separate image playback unit for the normal images having a normal number of lines, connected to the output of the video recorder. At least one H-image playback unit for images having a higher number of lines is also connected to a separate output of the image processing chain in such known systems.

The video recorder, therefore, does not participate in the transmission chain for playback of the H-image.

An x-ray diagnostics installation is disclosed U.S. Pat. No. 5,022,063 which can be operated in a number of imaging modes. In a fluoroscopic mode, the video camera operates with a low, i.e., normal resolution. The output of the video camera is connected to a processing circuit which reproduces normal images with a normal number of lines. In a number of operating modes for registering x-ray images, the video camera can be operated at a higher frame rate, or with a higher number of lines per frame. The output of the video camera in these operating modes is connected to a separate circuit for processing and reproducing high-resolution images. Due to this double circuit outlay— two processing circuits, two analog-to-digital converters, two digital-to-analog converters, and two monitors per video channel and per observation station, this known radiological system is expensive and complicated.

SUMMARY OF THE INVENTION

It is an object of the present invention to provide a radiological system which is capable of producing normal images as well as higher definition images having a higher number of lines than the normal image, wherein the video recorder which is used in the transmission of the normal images can be incorporated into the production of the images having a higher number of lines, thereby avoiding a large amount of the redundant circuitry as is present in conventional systems.

The above object is achieved in accordance with the principles of the present invention in a radiological system having an image pick-up chain which includes an image processor having an N-output for normal images and an H-output for H-images, a video recorder connectable to the N-output, and an H-image playback unit connectable to the H-output. The video recorder has an output connected through an up-scan standards converter to a switch, by means of which the H-image playback unit can be connected to the output of the up-scan standards converter, so that the H-image can be played back through the video recorder and through the up-scan standards converter. The up-scan standards converter is a scanning converter which is an up-converter with respect to the different standards applicable to the production of a normal image and to the production of an H-image.

The H-image playback unit for images having a high number of lines can thus be employed for the images reproduced by the video recorder. By incorporating the video recorder into the image transmission chain, the H-image playback unit can be used for the display of standard N-images, so that the display and associated circuitry necessary for standard image playback in conventional systems is not needed in the system of the invention.

The switch which is connected to the output of the up-scan standards converter can be an electronic switch, and the electronic switch and the up-scan standards converter can be formed as integral components of the image processor. As a result, an additional, external housing for the up-scan standards converter, which would otherwise be needed, can be avoided. Moreover, expensive BNC connections can also be avoided. In a further embodiment of the invention, the circuit components within the image processor, which would be necessary in a conventional processor for producing a standard image, can be co-used by the up-scan standards converter. Such components, for example, may include power supplies, memory modules, clock generators, analog-to-digital converters, digital-to-analog converters, etc. Due to the double utilization of these components for the overall operation of the image processor as well as for the up-scan standards converter contained therein, duplicate or redundant sets of these components can be eliminated, so that the costs of the overall system are farther reduced.

The cost advantage is particularly significant for so-called two-level radiological systems, i.e. a system wherein two images of the examination subject are generated while irradiating the subject with x-rays from respectively different directions.

Operation is simplified: in an embodiment of the invention wherein the switch operates automatically to connect the H-image playback unit to the output of the up-scan standards converter whenever there is an output signal from the up-scan standards converter present at the switch. The video recorder may also be utilized in the display of a still image, by storing the standard images as fields from which a frame can be generated by means of the up-scan standards converter for the purpose of playback of a still image of that frame. Moreover, the up-scan standards converter can be employed for correcting time-base errors in the video recorder.

The image quality of the images recorded by the video recorder can be improved in an embodiment of the radiological system of the invention wherein a filter is provided in the image processor having filter parameters which are variable, and which are controlled dependent on the image pick-up by the video recorder, so that the parameters can be matched to the current recording conditions.

The image processor may be a digital image processor and the video recorder may be a digital recorder, which can be connected via a control line to the image processor and which can be controlled so that memory functions necessary for the image processing in the image processor can be assumed by the video recorder.

DESCRIPTION OF THE PREFERRED EMBODIMENTS

Figure 1:
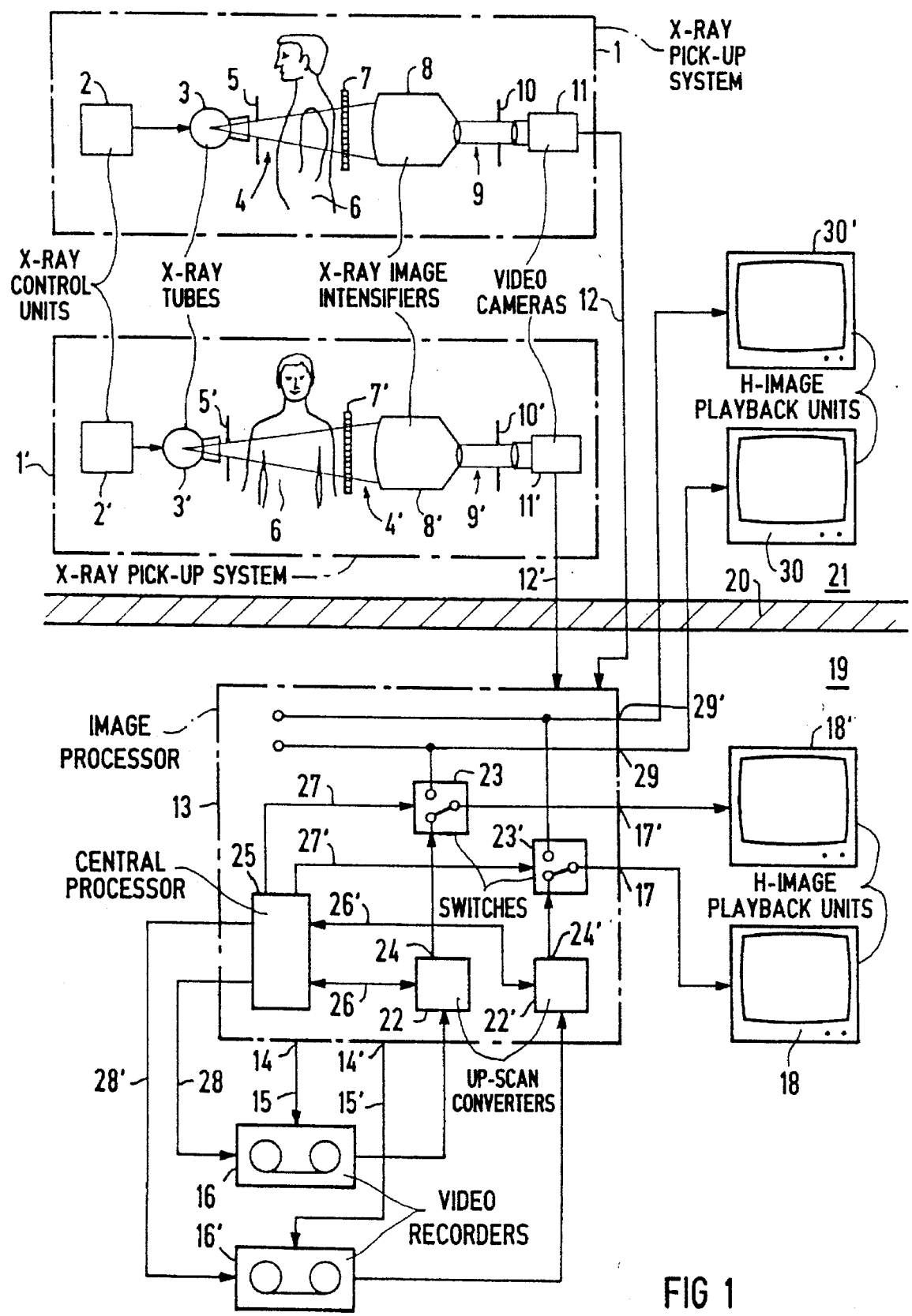
FIG. 1 is a schematic block diagram of a radiological system constructed and operating in accordance with the principles of the present invention.

A radiological system is shown in FIG. 1 having an image pick-up system 1 which includes an x-ray control circuit 2, an x-ray tube 3 which emits x-radiation 4 which penetrates an examination subject 6 and is incident in a known manner on the input screen of an x-ray image intensifier 8. The x-radiation 4 is gated by a diaphragm 5 and passes through a grid 7 following the examination subject 6. An optical beam 9 is emitted by the output screen of the x-ray image intensifier 8, and proceeds through a video iris 10 to a video camera 11. The video camera 11 has an output connected via a video line 12 to an image processor 13. The image processor 13 has an N-output 14 for normal images having a normal (standard) number of lines, for example 625 lines. A video recorder 16 is connectable to the N-output 14 via a video line 15. The image processor 13 also has an H-output 17 for images having a higher number of lines than the normal image, for example 1249 lines. An H-image playback unit 18 is connectable to the H-output 17. The H-image playback unit is disposed in a control room 19, which is separated from the examination room 21 by a wall 20.

In accordance with the principles of the invention, the output of the video recorder 16 is connected through an up-scan standards converter 22 to a switch 23, by means of which the H-image playback unit 18 can be connected to an output 24 of the up-scan standards converter 22. The switch 23 is preferably an electronic switch.

The switch 23 and the up-scan standards converter 22 are preferably integral component of the image processor 13. The functions required in the image processor 13 for image processing can be accomplished using components which can also be used by the up-scan standards converter 22. At least some of these functions can be conducted in a central processor 25 contained in the image processor 13. To permit the central processor 25 to also be used in the operation of the up-scan standards converter 22, the up-scan standards converter 22 is connected to the central processor 25 by a bi-directional line or lines 26. The image processor 13 may include other standard components which can also be co-utilized by the up-scan standards converter 24, however, these standard components are not separately shown in the schematic illustration of the image processor 13.

The switch 23 can be automatically operated so as to connect the H-image playback unit 18 to the output of the up-scan standards converter 24 whenever there is a video signal pending at the input of the up-scan standards converter 22. To that end, the up-scan standards converter 24 can provide a signal on the bi-directional connection 26 to the central processor 25 whenever a signal is present at the input of the up-scan standards converter 24 (or alternatively, whenever a signal is pending at the output of the up-scan standards converter 24). When the central processor 25 receives such a signal via the connection 26, the central processor 25 can operate the switch 23 via a control line 27. As a result, the H-image playback unit 18 is connected to the output of the up-scan standards converter 22.

The image processor 13 may be a digital image processor, preferably a digital card image system. A SVHS video recorder (N video standard) may be used as the video recorder 16. The video recorder 16 may be an analog video recorder or a digital video recorder. If the video recorder 16 is a digital video recorder, analog-to-digital converters and digital to analog converters are advantageously avoided at the interfaces between the image processor 13 and the video recorder 16.

In a further embodiment of the invention, the video recorder 16 can store the normal images as fields from which, for still image playback, a frame can be generated using the up-scan standards converter 22 in the image processor 13. Moreover, the up-scan standards converter 22 can also be employed for correcting time-base errors in the video recorder 16. In any case, a further improvement in the image quality is achieved upon playback of images from the video recorder 16.

Figure 2:
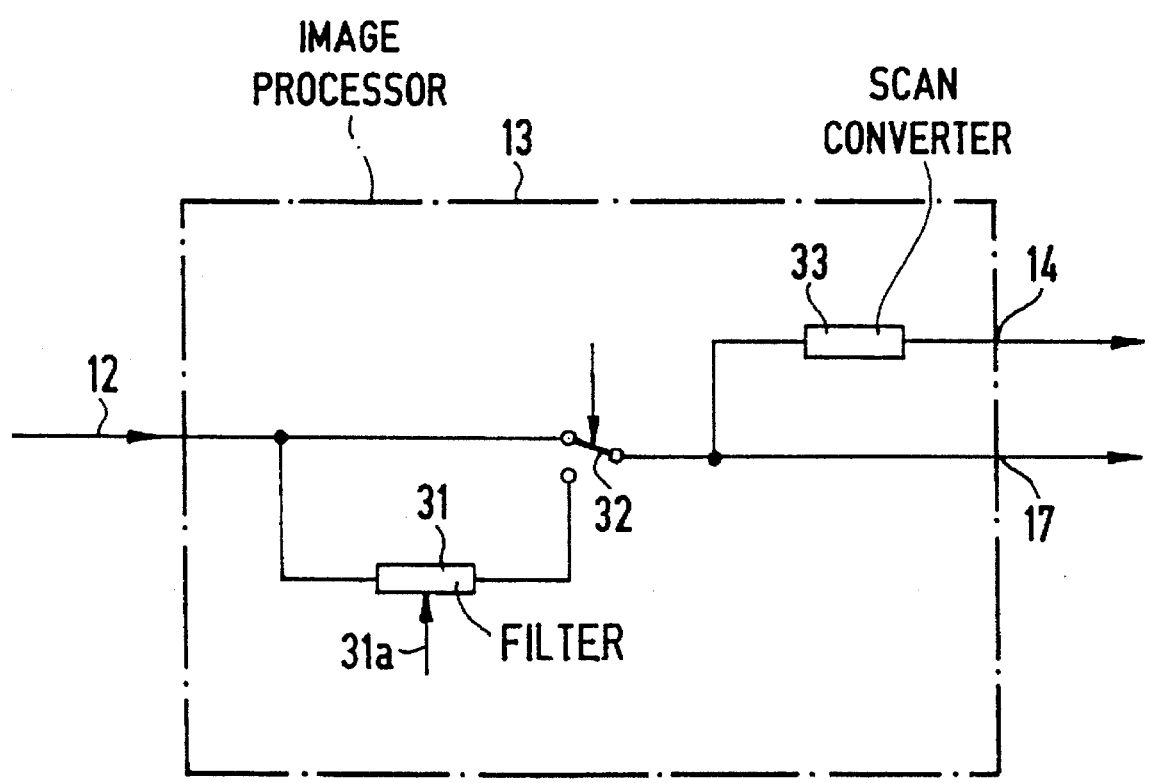
FIG. 2 is a schematic illustration showing further details of the image processor in the system of FIG. 1.

Further details of the image processor 13 are shown in FIG. 2. If the video camera 11 is a video camera for images having a high number of lines, the video signal can be directly through-connected via a switch 32 to the H-output 17 for playback through the connected H-image playback unit 18. A filter 31, for example a one-dimensional or two-dimensional spatial-frequency filter which is connected to a second terminal of the switch 32, is also connectable to the input of the image processor 13, and thus to the video line 12. A standards converter 33, for example a down-scan standards converter which is connected to the N-output 14, is also connected to the switch 32, so that images having a normal number of lines can be recorded with the video recorder 16 connected to the N-output 14.

The parameters of the filter 31 can be modified (controlled) dependent on operating parameters of the x-ray system 1 by means of control line 31 a leading to the filter 31 from, for example, the x-ray control circuit 2, or from some other component of the x-ray system 1. For example, if a fluoroscopic image is to be stored on the video recorder 16, a boost in detail contrast will typically ensue, and therefore a more pronounced spatial frequency filtering with low gray frequency ensues by means of control signals supplied on the control line 31, necessitated because of the limited bandwidth of the video recorder 16. If, by contrast, no recording is to be made using the video recorder 16, the parameters of the filter 31 can be set to normal fluoroscopic values. By means of the switch 32, the filter 31 can be connected into the processing circuitry at any time, both for use of the video recorder 16 and for the H-image playback unit 18. The standards converter 33 may be switchable, so that it can operate either as an up-scan standards converter or as a down-scan standards converter. To this end, either the output or the input of the video recorder 16 can be switched to be connected to the standards converter 33, dependent on the operating mode of the video recorder 16.

In a further embodiment of the invention, the video recorder 16 is a digital recorder, and is connected via a control line 28 to the central processor 25 of the image processor 13, and is controllable so that the memory functions necessary for image processing in the image processor 13 can be assumed by the video recorder 16. As a result, a portion of the conventional sequential image storage components can be eliminated within the image processor 13, which in this embodiment may be a digital card system. Such sequential image storage components are typically digital disk storage units, or large RAM semiconductor memories. The video recorder 16 is substantially automatically controlled, or is controlled from the central processor 25 so that it completely assumes the tasks of the conventional, internal sequential storage components of the image processor 13, for automatic recording for sequential playback and loop playback. If the video recorder 16 is controlled by means of the central processor 25, this can ensue via internal recorder interfaces, for example RS 232 or RS 422. As a result of the inclusion of the video recorder 16 in the operation of the image processor 13, other image processor components, need not be duplicated in the image processor 13, for example, components such as controllers.

If the video camera 11 is a type which scans with a high number of lines per frame, the down-scan standards converter 33 shown in FIG. 2 can be provided in the image processor 13, in which case the video recorder 16 will be connected to the output of the standards converter 33. Further, the video camera 11 can be coupled via the image processor 13 to another H-image output 29, to which another H-image playback unit 30, provided in the examination room, can be connected.

The above-described advantages of the radiological system of the invention are of particular significance if the radiological system is a so-called two-level system. This is represented in FIG. 1 by the aforementioned, non-prime reference numerals designating components forming the first level of the system, and identical components, referenced with primes, forming the second level of the system. The above description of the operation of the components forming the first level also applies to the components forming the second level. The direction of the x-radiation 4 penetrating the examination subject 6 in the second level is different from that in the first level, for example a rotation in the radiation direction by 90°, as indicated by the different orientation of the examination subject 6 in the respective schematic illustrations of the two levels.

Although modifications and changes may be suggested by those skilled in the art, it is the intention of the inventors to embody within the patent warranted hereon all changes and modifications as reasonably and properly come within the scope of their contribution to the art.

We claim as our invention:

1. A radiological system comprising:

image pick-up means for acquiring an optical image, corresponding to a radiological image, of an examination subject;

image processing means for converting said optical image in a single video chain into a normal image having a standard number of lines, supplied at a first output of said video chain, or into an image having a higher number of image lines than said normal image, supplied at a second output of said video chain;

a video recorder connectable to said first output;

playback means for displaying said image having a higher number of lines;

an up-scan standards converter in video chain of said image processing means connected to an output of said video recorder; and switch means in said image processing means, connected to an output of said up-scan standards converter and to said playback means for supplying an image from said video recorder to said playback means through said up-scan standards converter.

2. A radiological system as claimed in claim 1 wherein said switch means comprises electronic switch means, and wherein said electronic switch means and said up-scan standards converter are integral components of said image processing means.

3. A radiological system as claimed in claim 1 wherein said image processing means includes at least one component connected to said up-scan standards converter for co-use by said up-scan standards converter and said image processing means.

4. A radiological system as claimed in claim 1 wherein said switch means comprises means for automatically switching to connect said playback means to said up-scan standards converter when a video signal from said video recorder is supplied to said up-scan standards converter.

5. A radiological system as claimed in claim 1 wherein said video recorder comprises means for storing normal images as fields and for generating a frame for a still image playback through said up-scan standards converter.

6. A radiological system as claimed in claim 1 wherein said up-scan standards converter comprises means for correcting time-base errors in said video recorder.

7. A radiological system as claimed in claim I wherein said image processing means comprises digital image processing means.

8. A radiological system as claimed in claim 1 wherein said image pick-up means has operating parameters associated therewith, and said radiological system further comprising filter means in said image processing means for filtering a signal supplied to said image processing means from said image pick-up means dependent on said operating parameters.

9. A radiological system as claimed in claim 1 wherein said image pick-up means is disposed in an examination room, and wherein said playback means is disposed in a control room, separated from said examination room.

10. A radiological system as claimed in claim 1 wherein said video recorder comprises a digital recorder which includes memory functions, wherein said image processing means includes a central processor which controls operation of said image processing means, and said radiological system further comprising a control line connected between said digital recorder and said central processor for permitting memory functions for image processing required by said central processor to be assumed by said memory functions of said digital recorder.

11. A radiological system as claimed in claim 1, wherein said radiological system is a two-level system having first and second levels, said first level including said image pick-up means, said image processing means, said video recorder, said playback means, said up-scan standards converter and said switch means, and wherein said radiological system further comprises and said second level includes:

second level image pick-up means for acquiring a second level optical image, corresponding to a second level radiological image, of said examination subject;

second level image processing means for converting said second level optical image optionally into a second level normal image having a standard number of lines, supplied at a first output of said second level image processing means, or into a second level image having a higher number of image lines than said second level normal image, supplied at a second output of said second level image processing means;

a second level video recorder connectable to said first output of said second level processing means;

second level playback means for displaying said second level image having a higher number of lines;

a second level up-scan standards converter connected to an output of said second level video recorder; and second level switch means, connected to an output of said second level up-scan standards converter and to said second level playback means for supplying a second level image from said video recorder to said second level playback means through said second level up-scan standards converter.

* * * * *